Patented Nov. 21, 1933

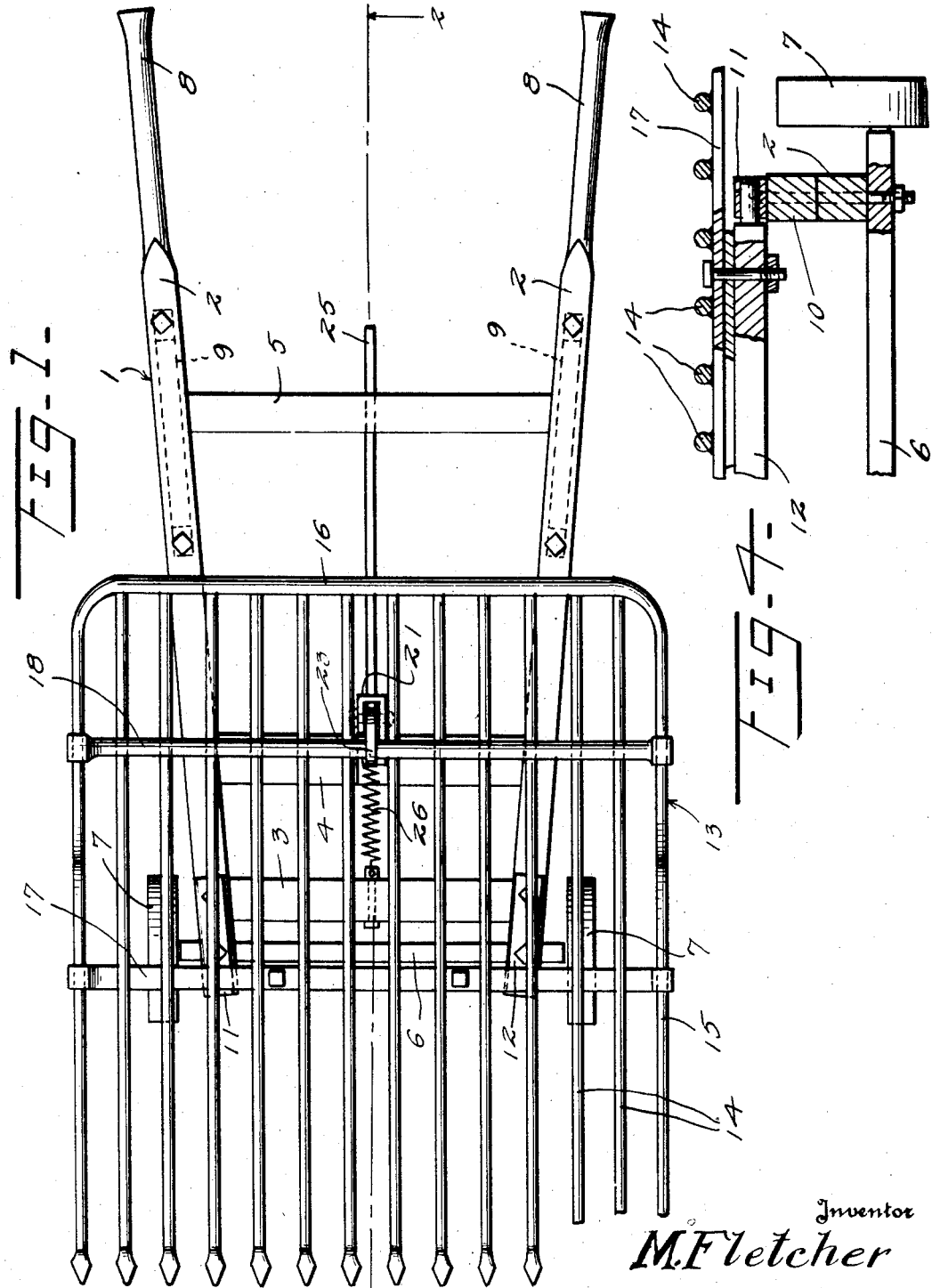

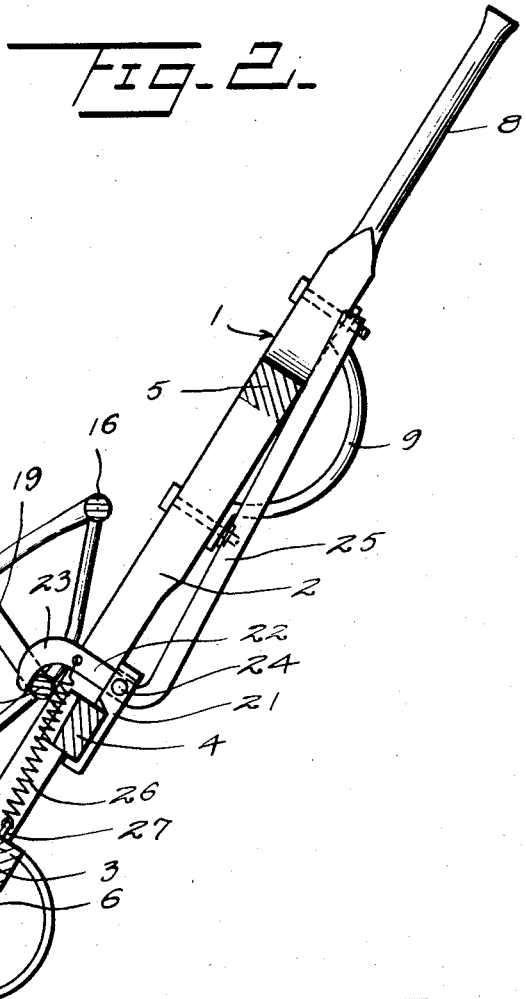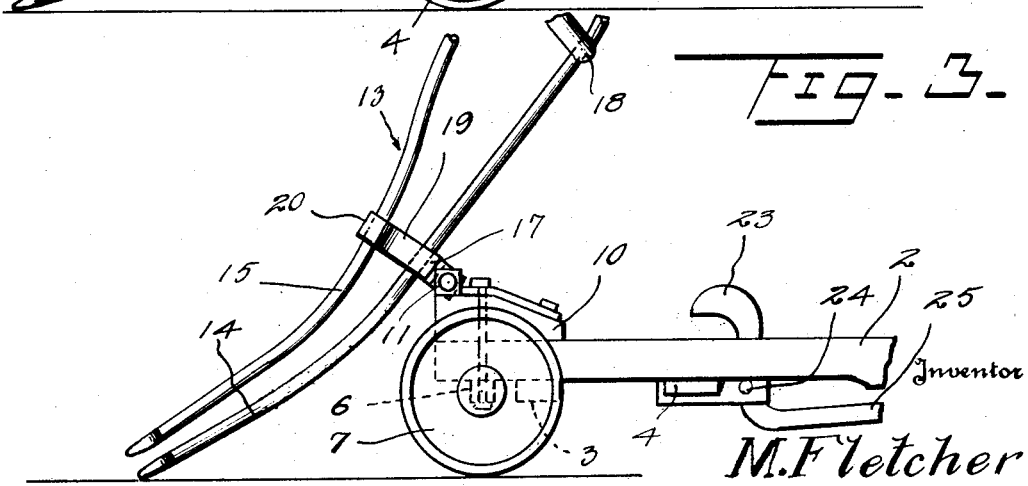

1,935,841

UNITED STATES PATENT OFFICE 1,935,841

COTTON SEED HULL FORK

Malcomb Fletcher, Asheboro, N. C.

Application September 10, 1932
Serial No. 632,605

3 Claims. (Cl. 280—57)

This invention relates to improvements in devices for gathering and transporting material and is designed particularly for handling cotton seed hulls, shavings, wood chips or any other material of a similar character.

The primary object of the present invention is to provide a material handling fork of relatively large capacity, mounted in such a manner as to be conveniently manually handled.

Another object of the invention is to provide a hand operated fork having a wheeled support with means whereby the fork may be released for oscillation to effect the dumping thereof.

The invention will be best understood from a consideration of the following detailed description taken in connection with the accompanying drawings forming part of this specification, with the understanding however, that the invention is not confined to any strict conformity with the showing of the drawings but may be changed or modified so long as such changes or modifications mark no material departure from the salient features of the invention as expressed in the appended claims.

In the drawings:—

Figure 1 is a view in top plan of the device embodying the present invention;

Figure 2 is a sectional view taken substantially upon the line 2—2 of Figure 1, the device being shown in scooping position;

Figure 3 is a view in side elevation of the forward portion of the mechanism showing the fork in dumping position;

Figure 4 is a sectional view taken on the line 4—4 of Figure 2.

Referring now more particularly to the drawings wherein like numerals of reference indicate corresponding parts throughout the several views, the numeral 1 indicates generally the carrying frame for the present device.

This frame is, as will be readily seen, in the form of a hand truck, it having the two beams each of which is indicated by the numeral 2, which are arranged in slightly convergent relation toward the front end of the device and which are connected by the forward, middle and rear cross bars 3, 4 and 5 respectively. The forward bar 3 is not disposed between the forward ends of the beams 2 but is slightly to the rear thereof and these forward ends are connected by and bolted to an axle 6 upon each end of which is mounted a wheel 7. The other ends of the beams 2 are formed to provide the handles 8.

Adjacent the rear ends, the beams 2 are each provided with a foot member 9 by which they are maintained in substantially horizontal position when the device is at rest.

Mounted upon the tops of the beams 2 at the forward ends, are the blocks 10, each of which has secured thereto a bearing 11 and disposed between these bearings is a shaft 12 which has its ends rotatably mounted in the bearings.

Disposed upon the frame structure 1 is a fork which is indicated as a whole by the numeral 13. This fork is made up of a plurality of intermediate tines 14 between border tines 15, which latter form integral continuations of a back bar 16 which as shown, extends transversely of the rear of the fork. The ends of the back bar 16 are curved forwardly to form the border tines 15, as illustrated.

The border tines 15 have disposed therebetween the transverse tine carrying bars 17 and 18, the ends of which are turned upwardly as indicated at 19 and terminate in the sleeves 20 through which the border tines pass. The tines 14 pass over and are secured to the cross bar 17 of the fork and pass through the intermediate cross bar 18 as shown, and then curve upwardly toward the back bar 16. It will thus be seen that with the intermediate tines 14 secured in the manner shown to the cross bars 17 and 18 and then turned upwardly at their rear ends toward the back bar 16, and with the border tines maintained in a higher plane than the intermediate tines by the upturned ends 19 of the cross bars 17 and 18, the fork is formed with a boll-like rear portion, whereas at its forward end the tines are disposed substantially in the same plane or they may be disposed upon a slight downwardly extending curve.

Secured to the intermediate cross bar 4 of the fork carrying frame is a yoke 21 in which is disposed the lower end of a normally vertically arranged hook shank 22, the hook portion 23 of the upper end thereof normally engaging over the cross bar 18 of the fork to maintain the fork in operative position upon the frame. The lower end of this shank 22 is pivotally held in place by the bolt 24 and extending rearwardly from the lower end of this shank beneath the cross bar 5 of the frame, is a hand lever 25 which is arranged for convenient oscillation by the operator of the fork, so that the rear of the fork may be released from the hook 23 to permit the fork to oscillate or tilt forwardly and dump the contents thereof.

In order to prevent the accidental displacement of the hook 23 there is connected to the shank portion 22 at a point well above the pivot point therefor, one end of a coil spring 26 which extends forwardly and has its other end attached in any suitable manner, as for example, to a bolt 27 carried by the forward cross bar 3. In operation, the operator of the fork grasps the handles 8 and upon raising the beams 2 to the inclined position which hand trucks of the character shown assume, the points of the tines 14 and 15 will be directed downwardly in such a manner as to enable the operator to force the same into a pile of seed hulls or any other material which is to be moved. After the fork has been loaded in this manner and the contents transported to the desired location they may be readily dumped by oscillating the lever 25 to release the rear of the fork and allow the forward end thereof to tip down. The fork may, of course, be readily dumped also by simply raising the beams 2 to an elevated position and pulling the fork rearwardly, thus causing the contents to slide off of the tines.

Having thus described the invention, what is claimed is:—

1. A device of the character described, comprising a truck having a pair of side beams, supporting wheels carrying said beams at one end, handle means at the other ends of the beams, a shaft oscillatably mounted upon said beams at the forward end and extending transversly thereof, a scoop fork mounted upon and secured to said shaft, said shaft extending transversely of the fork at a point substantially midway between its front and rear ends, a hook member pivotally carried by said beams and having releasable engagement with the rear portion of said fork, and resilient means normally maintaining said hook in engagement with the fork.

2. In a structure of the character described, a wheeled hand truck, a shaft oscillatably mounted upon the truck and extending transversely of the forward end thereof, a scoop fork attached to said shaft and comprising a transverse back bar and transverse intermediate bars, said intermediate bars having their ends turned upwardly, said back bar having its ends extended and curved forwardly to form border tines for the fork, said border tines being secured to the upturned ends of the cross bars, said back bar being disposed at a higher elevation than the cross bars, and intermediate tines extending transversely of said cross bars and secured thereto and curved upwardly at their rear ends for connection with said back bar, and means for releasably securing the rear of the fork to the truck.

3. In a structure of the character described, a wheeled hand truck, a shaft extending transversely of the forward end of the truck and oscillatably mounted thereon, a scoop-like fork supported by said shaft and having the shaft extending transversely of the middle portion thereof whereby the forward ends of the fork tines project a substantial distance beyond the truck, a bar disposed transversely of the fork adjacent its rear, a hook member oscillatably mounted upon the truck and adapted to engage over said bar, spring means normally drawing said hook member forward into engagement with the bar, and a control lever for the hook having one end connected with the hook and extending rearwardly therefrom for actuation from the rear of the truck.

MALCOMB FLETCHER.